United States Patent [19]

Shibuya et al.

[11] Patent Number: 4,998,117

[45] Date of Patent: Mar. 5, 1991

[54] THERMAL TRANSFER PRINTER

[75] Inventors: Kouji Shibuya; Junichi Yamamoto, both of Osaka, Japan

[73] Assignee: Minolta Camera Kabushiki Kaisha, Osaka, Japan

[21] Appl. No.: 452,334

[22] Filed: Dec. 19, 1989

[30] Foreign Application Priority Data

Dec. 19, 1988 [JP] Japan .......................... 63-164114[U]

[51] Int. Cl.[5] .......................................... G01D 15/10

[52] U.S. Cl. ............................ 346/76 PH; 400/120; 242/57.1; 242/67.3 R; 226/18; 226/19; 226/21

[58] Field of Search ................ 346/76 PH; 242/57.1, 242/67.3 R; 226/18, 19, 21; 400/120

[56] References Cited

U.S. PATENT DOCUMENTS

| | | | |
|---|---|---|---|
| 4,318,113 | 3/1982 | Skafuenstedt et al. | 226/21 |
| 4,425,568 | 1/1984 | Moriguchi et al. | 346/76 PH |
| 4,463,360 | 7/1984 | Kikuchi et al. | 346/76 PH |
| 4,919,555 | 4/1990 | Kikuchi | 242/57.1 |

*Primary Examiner*—Mark J. Reinhart
*Assistant Examiner*—Huan Tran
*Attorney, Agent, or Firm*—Burns, Doane, Swecker & Mathis

[57] ABSTRACT

In a thermal transfer recording apparatus comprising an ink film coated with a heat-fusion type ink, an ink film supplying roller rotatably mounted at a first support member, an ink film winding roller rotatably mounted at a second support member, and a recording station wherein a recording material contacts with the ink film to be recorded an image information by a heat transfer, the first and second support members are rotatable respectively around a first axis and a second axis provided at ends of a rotating member which connects the first and second support members, so that the first and second support members integrally rotate around a third axis provided substantially at a center of the rotating member.

13 Claims, 5 Drawing Sheets

THERMAL TRANSFER PRINTER

BACKGROUND OF THE INVENTION

1. Field of the Invention

The present invention relates to a thermal transfer printer for transferring images to a recording sheet using a ink film coated with a heat-fusion type ink.

2. Description of the Related Arts

Conventional thermal transfer printers have a platen roller 1 and a retractable thermal head 2 or the like capable of making and breaking contact with said platen roller 1, as shown in FIG. 4. Recording sheet 3 is transported, by a transport means, between platen roller 1 and thermal head 2 so as to wrap around the outer surface of said platen roller 1.

An ink film 4, which is coated on one side with a heat-fusion ink, is fed so as to pass medially between the aforesaid recording sheet 3 and thermal head 3. The ink film 4 is fed from an ink film roll 5, guided by guide rollers 7 and 8, and rerolled onto ink film reel 6.

Because the ink film 4 used in the aforesaid conventional thermal transfer printer is an extremely thin film having a thickness of about 3 to 10 μm to improve transfer efficiency, it is transported at an incline with unequal tension on the upstream and downstream side of the platen roller in the film transport direction when the ink film is fed, which at times produces a twist in the film and causes poor ink transfer to the recording sheet. Further, wrinkles are at times produced in the film during the ink film 4 transporting process. These wrinkles are thought to be caused by dislocation of ink film roll 5 and ink film reel 6 respectively used to feed the ink film to thermal head 2 and rewind the film thereafter, and by stretching the film 4 with different tension on the upstream and downstream side of the platen roller in the film transport direction due to the peeling process.

The latter case results in a great discrepancy in the quantity of ink transferred to recording sheet 3 in the width direction of film 4, because as ink film 4 is peeled from recording sheet 3 after the transfer, the peeling force causes a large disparity in the tension on ink film 4 on the upstream and downstream side of the platen roller in the film transport direction, such that when the ink transfer occurs after wrinkles are produced in the ink film, poor ink transfer will result.

In U.S. Pat. application Nos. 4,425,568 and 4,463,360, the inside of the ink film makes touching contact with a stress-absorbing roller disposed between the platen and the supply roller, the center of rotation of said stress-absorbing roller being inclined in a perpendicular direction relative to the surface of the ink film. By inclining the stress-absorbing roller, tension is equalized in the width direction of the ink film. However, the degree of parallelism between the film supply roller and the rerolling roller cannot be maintained, and the ink film cannot be transported with uniform tension.

SUMMARY OF THE INVENTION

A main object of the present invention is to provide a thermal transfer printer capable of accomplishing suitable transfers.

A further object of the present invention is to provide a thermal transfer printer capable of transporting ink film without twisting or wrinkling said film.

These and other objects of the present invention are accomplished by providing a thermal transfer printer having a platen roller and a retractable thermal head capable of making and breaking contact with said platen roller, and which transports the aforesaid recording sheet between the platen roller and the thermal head, and transports an ink film between the recording sheet and the thermal head so as to transfer images to the recording sheet, said thermal transfer printer being characterized by having a first cradle which supports the ink film supply roller around which the ink film is wound, and which is mounted so as to be capable of bidirectional oscillation in parallel and perpendicular directions relative to the ink film transport direction; and a second cradle which supports the ink film receiving roller around which the film is rewound, and which is mounted so as to be capable of bidirectional oscillation in parallel and perpendicular directions relative to the ink film transport direction.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
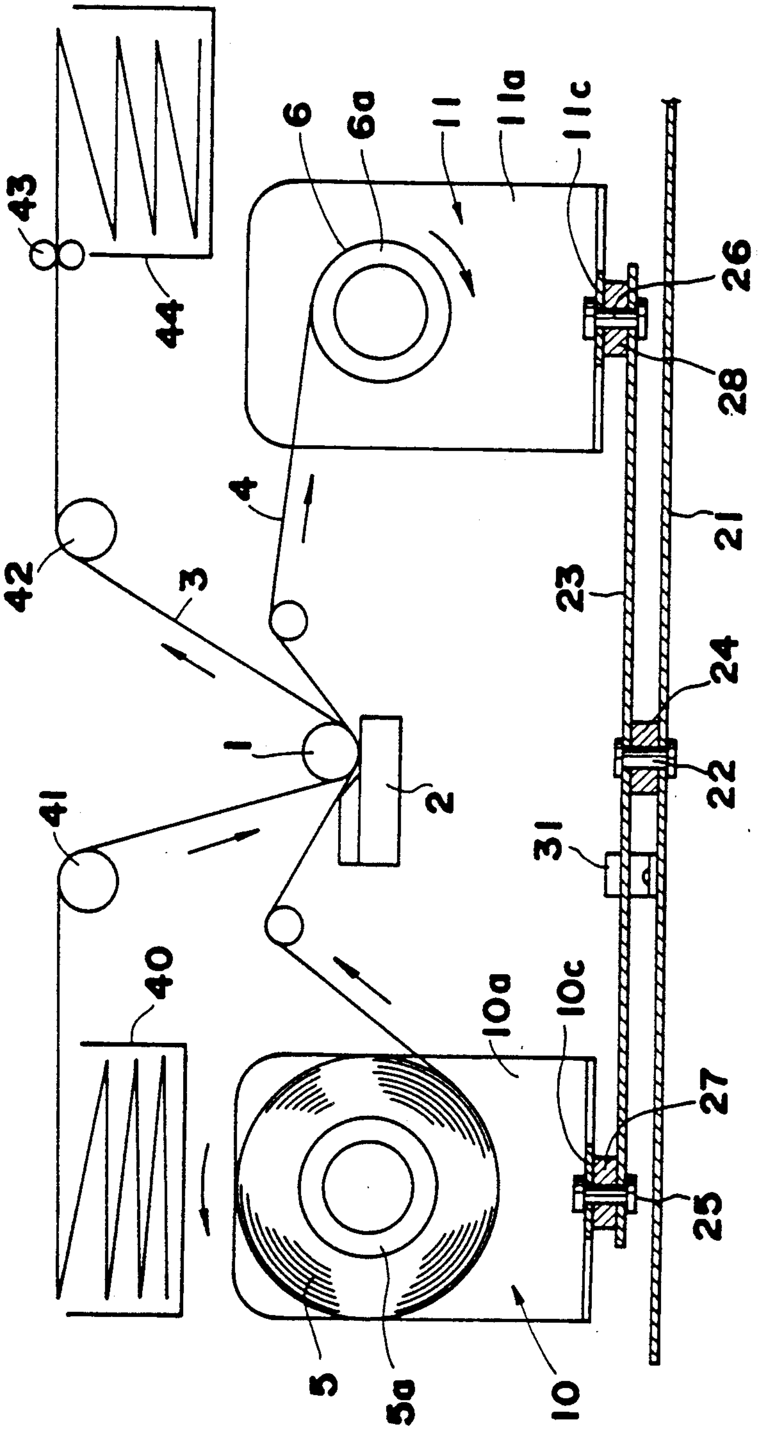
FIG. 1 is a cross section view along line I—I shown in FIG. 2 which illustrates an embodiment of the thermal transfer printer of the present invention.
Figure 2:
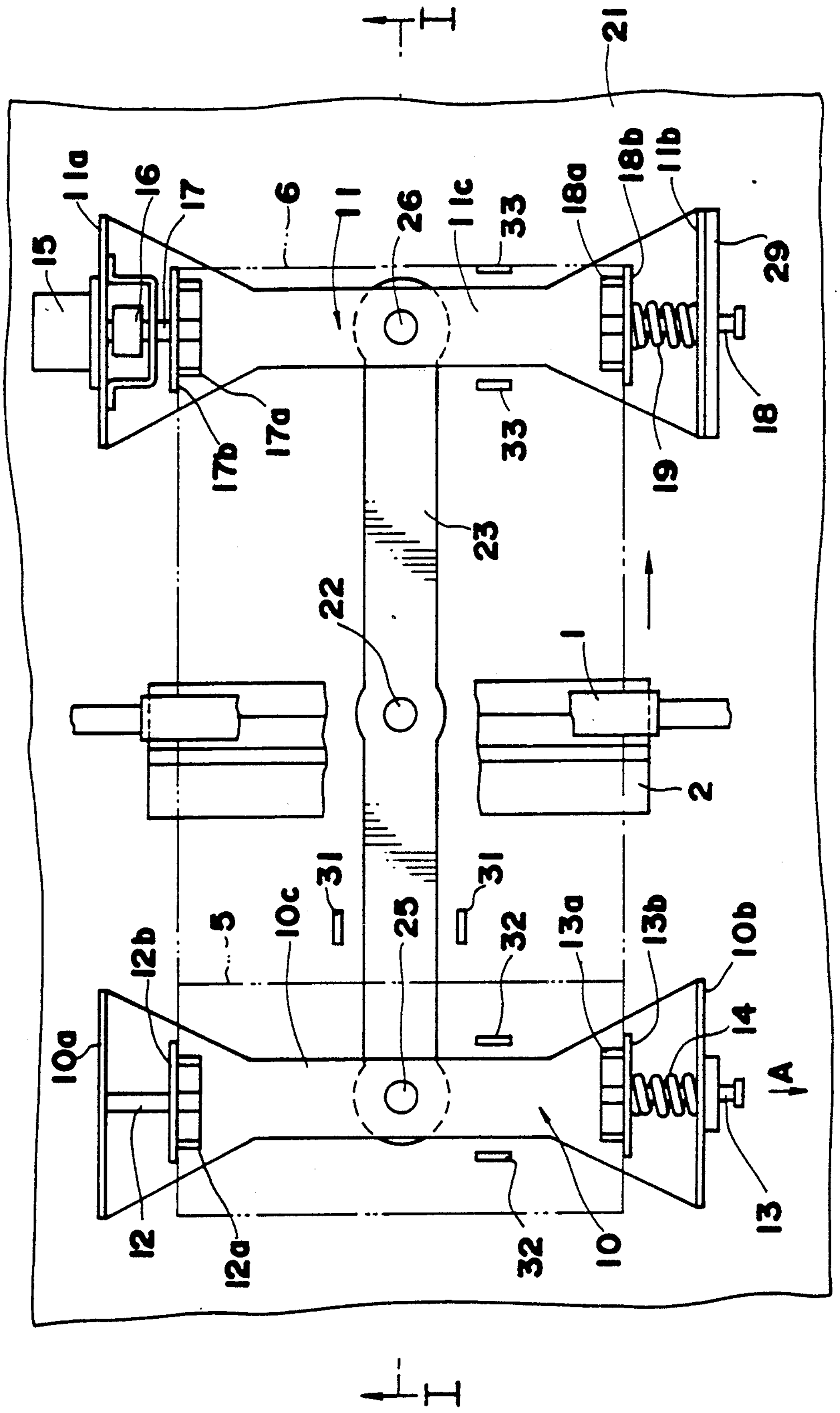
FIG. 2 is a top plan view of the thermal transfer printer shown in FIG. 1.

FIGS. 1 and 2 show the essential portions of an embodiment of the present invention.

The thermal transfer printer shown in FIG. 1 has a recording sheet 3 interposed between a platen roller 1 and a thermal head 2.

In the drawings, the item labeled 40 is a sheet supply tray which accommodates recording sheets of uniform length. The sheets accommodated in the tray are fed to the nip section of the platen roller and the thermal head via first guide roller 41, whereupon the ink transfer occurs. After the ink transfer, the recording sheet is accommodated in output tray 44 via a second guide roller 42 and output rollers 43.

On the other hand, the surface of ink film 4 is coated with a heat-fusion type ink. The unused portion of ink film 4 is wound around a cylindrical core 5*a* of ink film roll 5, while the used portion of ink film 4 is rewound around a cylindrical core 6*a* of ink film reel 6. Ink film roll 5 is mounted on a first cradle 10, while ink film reel 6 is mounted on a second cradle 11. First cradle 10 and second cradle 11 are mounted via pins 25 and 26 respectively so as to be movable on rotatable plate 23.

Support pin 22 attached to the main base plate 21 fits in the center portion of rotatable plate 23. Rotatable plate 23 is movable about the center shaft of the aforesaid support pin 22. Rotatable plate 23 is separated from base plate 21 by means of a spacer 24 fit onto support pin 22, so that the aforesaid movement of plate 23 about the center shaft of support pin 22 is smooth. Support pin 22 is disposed at a fixed position on base plate 21, so as to position the rotational center shaft of platen roller 1 above or near the extension of the center shaft of support pin 22.

The construction of the first and second cradles are hereinafter described in more detail with reference to FIG. 2.

Two facing brackets 10*a* and 10*b* used to support ink film roll 5 are connected to a base 10*c*; brackets 10*a* and 10*b* and base 10*c* comprise the first cradle 10 for supporting ink film roll 5. Similarly, two facing brackets 11*a* and 11*b* used to support ink film reel 6 are connected to a base 11*c*; brackets 11*a* and 11*b* and base 11*c* comprise the second cradle 11 for supporting ink film reel 6.

First cradle 10 is mounted so as to be oscillatable and rotatable on a center shaft formed by pin 25, which is arranged at one end of rotatable plate 23 on base 10*c* so as to be perpendicular relative to the ink film 4 transport direction, and second cradle 11 is mounted so as to be freely oscillatable and rotatable on a center shaft formed by pin 26, which is arranged at the opposite end of the aforesaid rotatable plate 23 on base 11*c* so as to be perpendicular relative to the ink film 4 transport direction. To assure the smooth movement of the aforesaid cradles 10 and 11, the respective pins 25 and 26 are fitted with spacers 27 and 28.

Further, a support shaft 12 is provided a flange 12*b* and a fitting 12*a* that fits into the end of ink film roll 5, said support shaft 12 being fixedly attached to the aforesaid bracket 10*a*. In addition, an oscillating shaft 13 that is freely oscillatable in the axial direction is provided a flange 13*b* and a fitting 13*a* that fits into the other end of ink film roll 5, said oscillating shaft 13 being mounted to the previously described bracket 10*b*. A spring force in the ink film transport direction is applied to the aforesaid oscillating shaft 13 via a coil compression spring 14.

An ink film winding motor 15 is connected to the outer side of the previously described bracket 11*a*, and the tip of drive shaft 17, which is connected via a clutch 16 to the main shaft of said motor 15, is provided a flange 17*b* and fitting 17*a* that fits in ink film reel 6. The tip of oscillating shaft 18 has a flange 18*b* and a fitting 18*a* which fits in ink film reel 6 attached thereto, said oscillating shaft 18 is attached to the previously described bracket 11*b* so as to be oscillatable in the axial direction. A spring force in the ink film transport direction is applied to the aforesaid oscillating shaft 18 via a coil compression spring 19.

The weights of flange 11*a* attached to motor 15 and clutch 16 and the opposite flange 11*b* are balanced, and a weight 29 is provided on flange 11*b* of second cradle 11 so as to assure said second cradle 11 will move smoothly with a rotational center about pin 26.

A pair of stoppers 31 are fixedly attached to base plate 21 with specific spacing therebetween to regulate the movement of the previously described moveable plate 23 within a certain specified range of movement, and similarly, two pairs of stoppers 32 and 33 are fixedly attached to base plate 21 to regulate the range of movement of the two cradles 10 and 11 respectively within a specified range.

With ink film 4 installed in the ink film transport portion of the thermal transfer printer shown in FIGS. 1 and 2 and oscillating shaft 13 in the state wherein said shaft 13 is retracted in the direction of arrow A against the force exerted by spring 14, said oscillating shaft 13 is returned to its former position after fitting 12*a* fits into the core 5*a* of the ink film roll 5 until flange 12*b* makes contact with the end face of ink film roll 5. The result of the aforesaid operation is that fitting 13*a* is fitted into core 5*a* until flange 13*b* on the other side of ink film roll 5 makes contact with the end face of said film roll 5. Accordingly, the loading of ink film roll 5 is completed, and ink film reel 6 is loaded in an identical sequence of procedures to complete the loading operation for ink film 4. The respective ink film roll 5 and reel 6 are pressed in the axial direction by springs 14 and 19.

When an image is formed on recording sheet 3, ink film 4 is fed from ink film roll 5 by means of the operation of motor 15, and wound onto ink film reel 6 Although the driving force of motor 15 is transmitted to ink film reel 6 via clutch 16, said clutch 16 functions as a torque limiter so that when platen roller 1 is enjoined with the thermal head 2 during the copy operation, the torque transmitted to the ink film 4 is not greater than the moving force of the transported recording sheet 3. Thus, reeling of excess ink film 4 during the transfer process is preventing, and the speed differential between the transport speed of the recording sheet 3 and the transport speed of ink film 4 is absorbed.

Figure 3A:
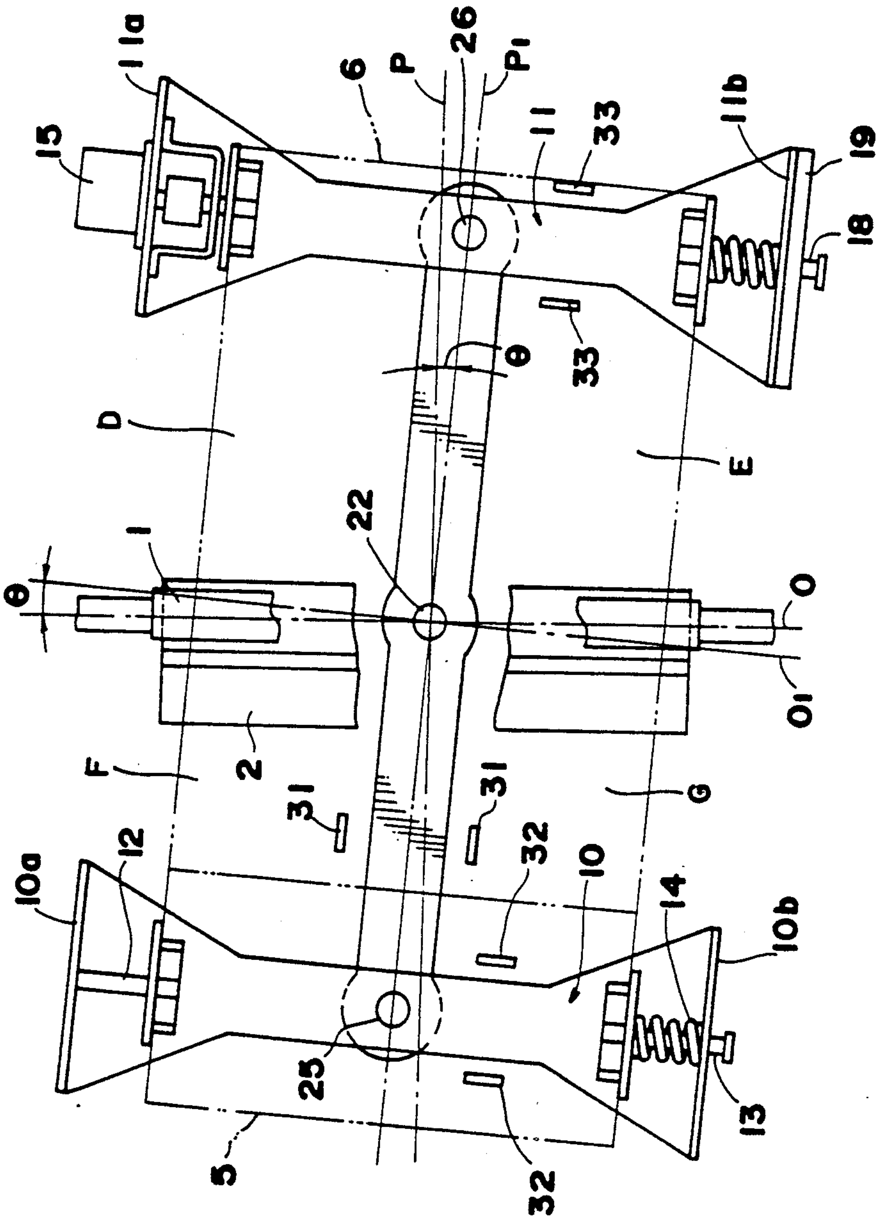
FIG. 3A shows an embodiment of the thermal transfer printer of the present invention wherein the ink film transport direction is not perpendicular relative to the center shaft of the platen roller.

To assure a suitable transfer operation, it is desirable to load the ink film 4 in the film transport portion of the thermal transfer printer so that the film transport direction is perpendicular relative to the axis of rotation of platen roller 1. Accordingly, the ink film roll 5 and reel 6 must be installed with great precision in conventional thermal transfer printers so as to have the rotational axes of said roll 5 and reel 6 coincide with the rotational axis of platen roller 1, while such consideration is unnecessary in the printer of the present invention. Therefore, a situation may be hypothesized, for example, wherein the actual transport direction of ink film 4 is inclined an angle Θ relative to the appropriate transport direction P that is perpendicular to the rotational axis 0 of platen roller 1, as shown in FIG. 3A. When this positional dislocation is viewed using platen roller 1 as a base, the position $O_1$ of platen roller 1, which is required for proper transfer of ink film 4, is inclined at an angle Θ from the 0 position relative to ink film 4 transport direction $P_1$. At this time, one side of the section wherein the inside of ink film 4 has passed platen roller 1 and thermal head 2 is designated section D, the opposite side of the film is designated section E, and the upstream inside prior to aforesaid passage is designated section F, and the opposite side is designated section G.

When the previously described installation error occurs and motor 15 is operated to wind ink film 4 on film reel 6, the actual ink film 4 transport direction $P_1$ is inclined an angle Θ relative to direction P that is perpendicular to the center of rotation axis 0 of platen roller 1, therefore the aforesaid sections D and G have a higher tension than sections E and F. This situation results in counterclockwise rotational forces centered at pins 22, 25 and 26 being applied to rotatable plate 23, and first and second cradles 10 and 11, as shown in FIG. 3A. More specifically, a rotational force acts on ink film 4 and, in turn, first and second cradles 10 and 11 due to the tension applied to ink film 4 while said film is wound, said rotational force occurring in the actual film 4 transport direction P which is virtually perpendicular to the rotational center axis 0 of platen roller 1.

Figure 3B:
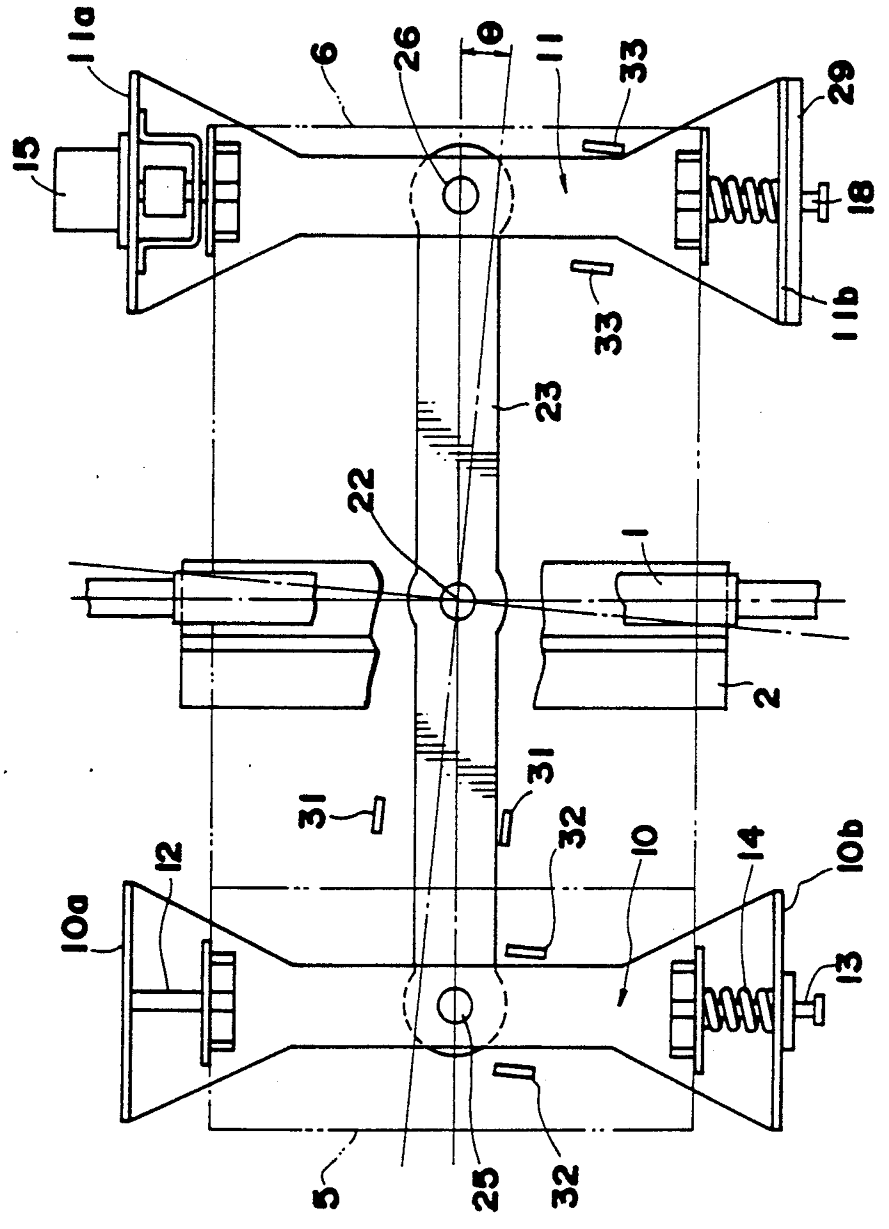
FIG. 3B shows an embodiment of the thermal printer of the present invention wherein the ink film mounting error shown in FIG. 3A is corrected, and the ink film transport direction is perpendicular to relative to the center shaft of the platen roller.
Figure 4:
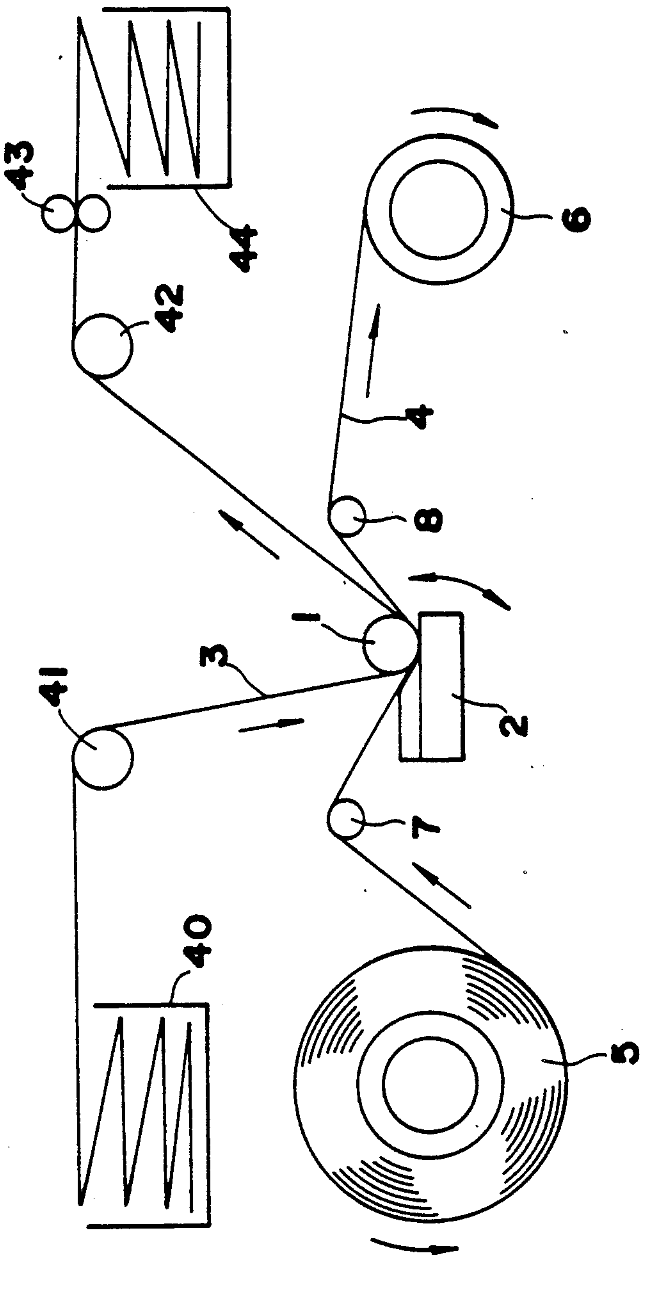
FIG.4 PRIOR ART
FIG. 4 is an elevation view showing the basic construction of a conventional thermal transfer printer.

The result of the action of the aforesaid tension and rotational force is that first and second cradles 10 and 11 move while maintaining parallel positions, such that rotatable plate 23 and first and second cradles 10 and 11 change attitude, as shown in FIG. 3B. In the aforesaid state, the rotational center axes of both ink film roll 5 and ink film reel 6 are parallel to the rotational center axis of platen roller 1, that is, in a state wherein suitable transfer operation may be accomplished Accordingly, even if the ink film 4 is installed in the thermal transfer printer imprecisely so as to produce a mounting error relative to the rotational center axis of platen roller 1, the ink film 4 is automatically adjusted so as to assume the proper attitude at the start of the printing operation, thereby eliminating twisting of said ink film 4 when the film 4 separates from the recording sheet 3, which is the major cause of wrinkles forming in the film.

Even when ink film 4 has been properly loaded in the printer, a disparity may occur in the quantity of ink transferred from ink film 4 to the recording sheet 3 in the width direction of said recording sheet 3, that is, when ink film 4 separates from the recording sheet 3 after passing between thermal head 2 and platen roller 1, disparate separation force is produced in the width direction of ink film 4 causing disparate tension to be applied to said ink film 4 in the width direction. In such a case, both ink film roll 5 and ink film reel 6 are synchronized and have rotational axes at pins 25 and 26 respectively, and automatically oscillate while maintaining a parallel positional relationship in a plane parallel to the transport plane of ink film 4, so that the tension is equalized on all along ink film 4. Twisting, and particularly wrinkling of ink film 4 can thereby prevented, and proper ink transfer can be accomplished.

If both ink film roll 5 and ink film reel 6 only oscillate as previously described, rotatable plate 23 becomes unnecessary, and first and second cradles 10 and 11 may be mounted so as to be directly rotatable on base plate 21 via pins 25 and 26 without using rotatable plate 23.

A further application of the construction shown in the drawings is possible wherein the ink film roll 5 and ink film reel 6 are housed within a casing so that ink film 4 may be accommodated in a cassette. In such a case, the casing of the cassette itself fulfills the function of base plate 21. Further, using ink films coated with yellow, magenta, cyan and other color ink is also possible.

In addition, the present invention may also be used in either of thermal transfer printers employing sequential methods and multihead type thermal transfer printers, and recording sheet 3 may be either cut sheets, continuous sheets, or various other types.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A thermal transfer recording apparatus comprising:

a supplying means for supplying an ink film;

a winding means for winding said ink film supplied from said supplying means;

a recording means provided between said supplying means and said winding means for recording images on a recording medium by heat transfer, said recording means including a heating means in contact with one side of the ink film for heating the ink film and a contact means on the other side of the ink film so that the ink film and the recording medium may be pressed between said heating means and the contact means;

a feeding means for feeding said recording medium between the ink film and said contact means;

a first support means for rotatably supporting said supplying means;

a second support means for rotatably supporting said winding means; and a connecting means for connecting said first support means and said second support means, the first support means moving around a first axis provided at one end of said connecting means and the second support means moving around a second axis provided at another end of the connecting means so that the first and second support means integrally move around a third axis provided substantially at a center of the connecting means.

2. A thermal transfer recording apparatus as claimed in claim 1, wherein each of first support means, second support means and connecting means is provided with a pair of regulating members for regulating a rotating range thereof.

3. A thermal transfer recording apparatus as claimed in claim 1, wherein said first axis and said second axis are respectively arranged at said connecting means perpendicularly to an ink film supplying direction.

4. A thermal transfer recording apparatus as claimed in claim 1, wherein said third axis is positioned under said pressing means.

5. A thermal transfer recording apparatus as claimed in claim 1, wherein said connecting means includes a connecting member pivotably movable mounted at a fixed plate by the third axis through a spacer.

6. A thermal transfer recording apparatus comprising:

a first support means for supporting a supplying roller which supplies an ink film;

a second support means for supporting a winding roller which winds said ink film supplied from said supplying roller;

a recording means provided between said supplying roller and said winding roller for recording images on a recording medium by heat transfer, said recording means including a heating means in contact with one side of the ink film for heating the ink film and a contact means on the other side of the ink film so that the ink film and the recording medium may be pressed between said heating means and the contact means;

a feeding means for feeding said recording medium between the ink film and said contact means; and a third support means for movably supporting said first support means and said second support means so that the first support means move relatively to the second support means while keeping a parallel positional relationship with the second support means.

7. A thermal transfer recording apparatus comprising:

a supplying means for supplying an ink film;

a winding means for winding said ink film supplied from said supplying means;

a recording means provided between said supplying means and said winding means for recording images on a recording medium by heat transfer, said recording means including a heating means in contact with one side of the ink film for heating the ink film and a contact means on the other side of the ink film so that the ink film and the recording medium may be pressed between said heating means and the contact means;

a feeding means for feeding said recording medium between the ink film and the contact means;

a first support means for rotatably supporting said supplying means;

a second support means for rotatably supporting said winding means; and a connecting means for connecting said first support means and said second support means so that said first support means moves in synchronism with said second support means.

8. In a thermal transfer recording apparatus composed of a supplying means for supplying an ink film, winding means for winding said ink film supplied from said supplying means, and a recording means including a heating means and a contact means for recording an image information on a recording material transported from a recording material source means, a method comprising the steps of:

providing said supplying means on one side of said recording means;

providing said winding means on the other side of said recording means; and connecting the supplying means with the winding means by a connecting means so that the supplying means and the winding means freely move respectively around a first axis and a second axis which are provided at said connecting means perpendicularly to an ink film supplying direction.

9. A thermal transfer recording method as claimed in claim 8, further comprising the steps of:

supporting said connecting means so as to move around a third axis provided substantially at a center of the connecting means.

10. A thermal transfer recording method as claimed in claim 8, wherein each of the supplying means, winding means and connecting means is provided with a pair of regulating members for regulating a rotating range thereof.

11. A thermal transfer recording method as claimed in claim 8, wherein said connecting means is pivotably mounted at a fixed plate.

12. A thermal transfer recording method as claimed in claim 8, wherein said connecting means is supported under a platen roller included in said contact means.

13. In a thermal transfer recording apparatus composed of a supplying means for supplying an ink film, winding means for winding said ink film supplied from said supplying means, and a recording means including a heating means and a contact means for recording an image information on a recording material transported from a recording material source means, a method comprising the steps of:

providing a first support means for supporting a supplying roller which supplies an ink film;

providing a second support means for supporting a winding roller which winds said ink film supplied from said supplying roller; and supporting said first support means and said second support means so as to relatively move each other while keeping a parallel positional relationship therebetween.

* * * * *